Oct. 17, 1967  H. F. CARLSON  3,347,349
PLATE INVERTING APPARATUS
Filed April 28, 1966                                    2 Sheets-Sheet 1
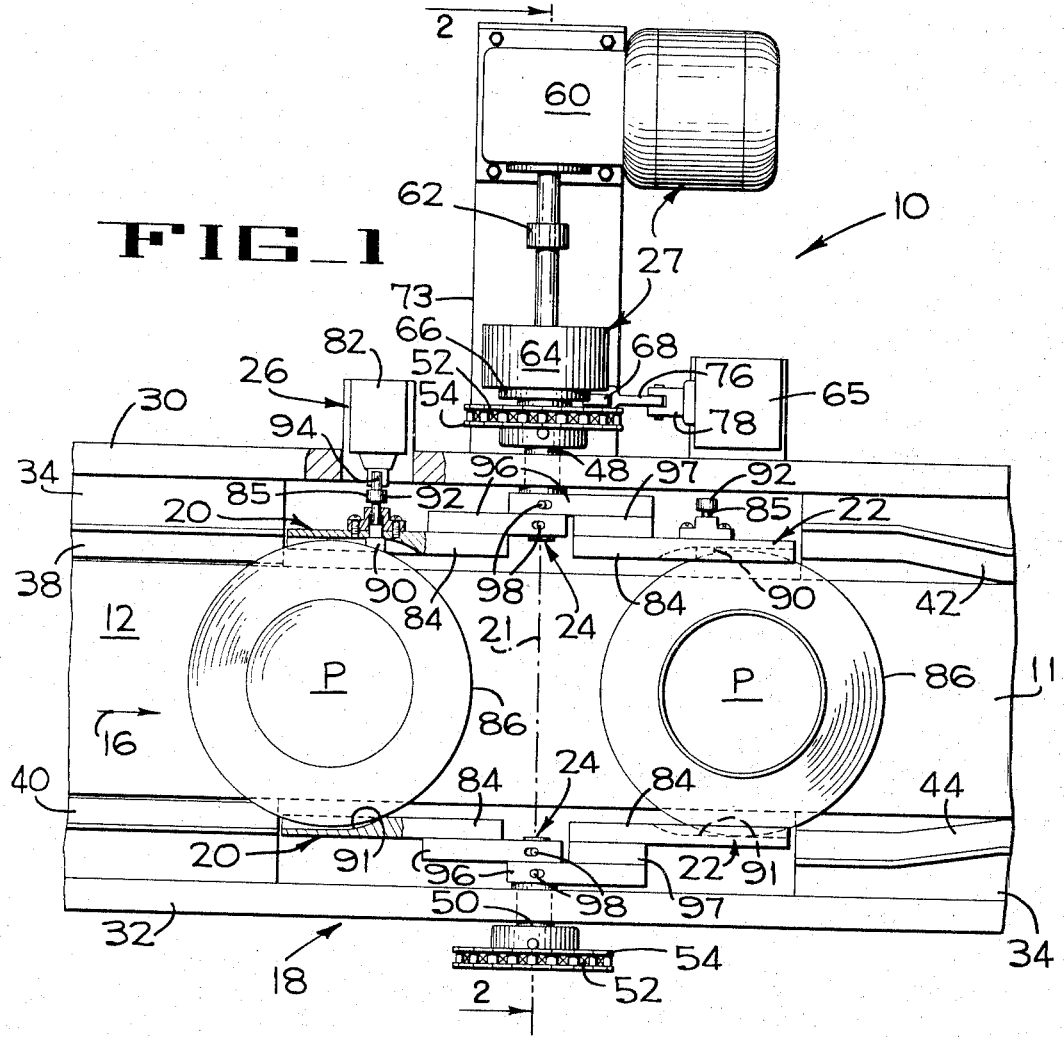
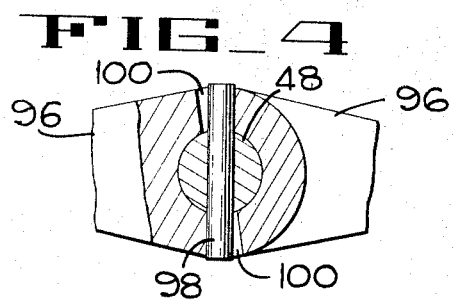
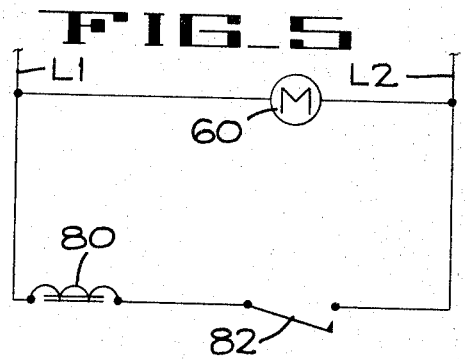
INVENTOR
HEINZ F. CARLSON
BY  *Francis W. Anderson*
ATTORNEY Oct. 17, 1967  H. F. CARLSON  3,347,349
PLATE INVERTING APPARATUS
Filed April 28, 1966  2 Sheets-Sheet 2
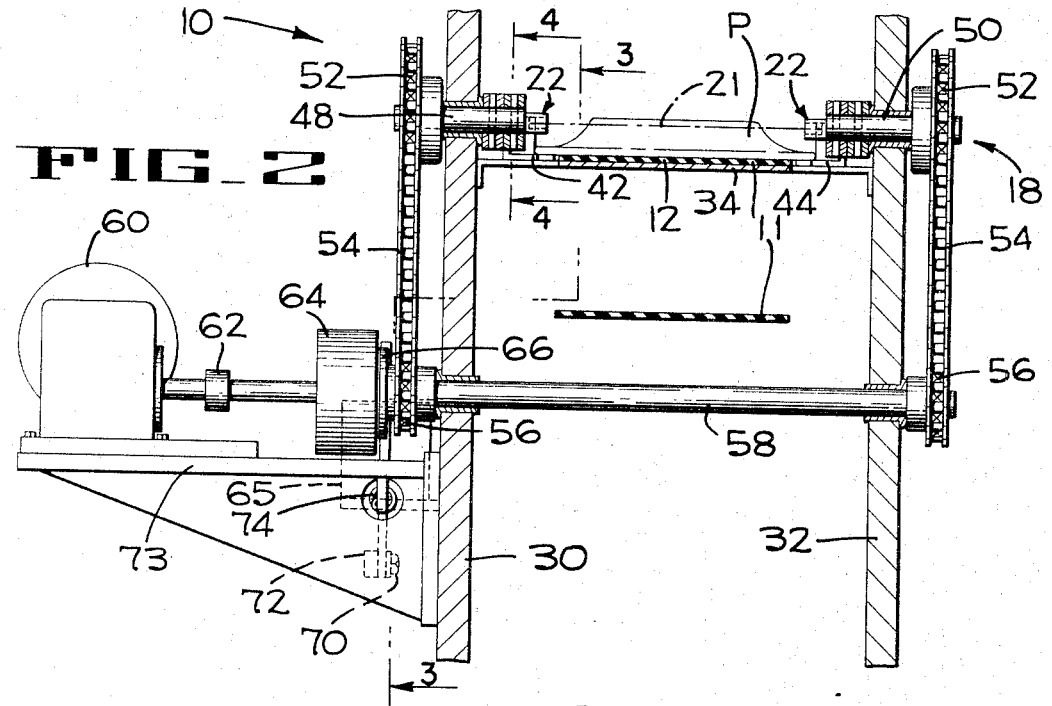
FIG_2
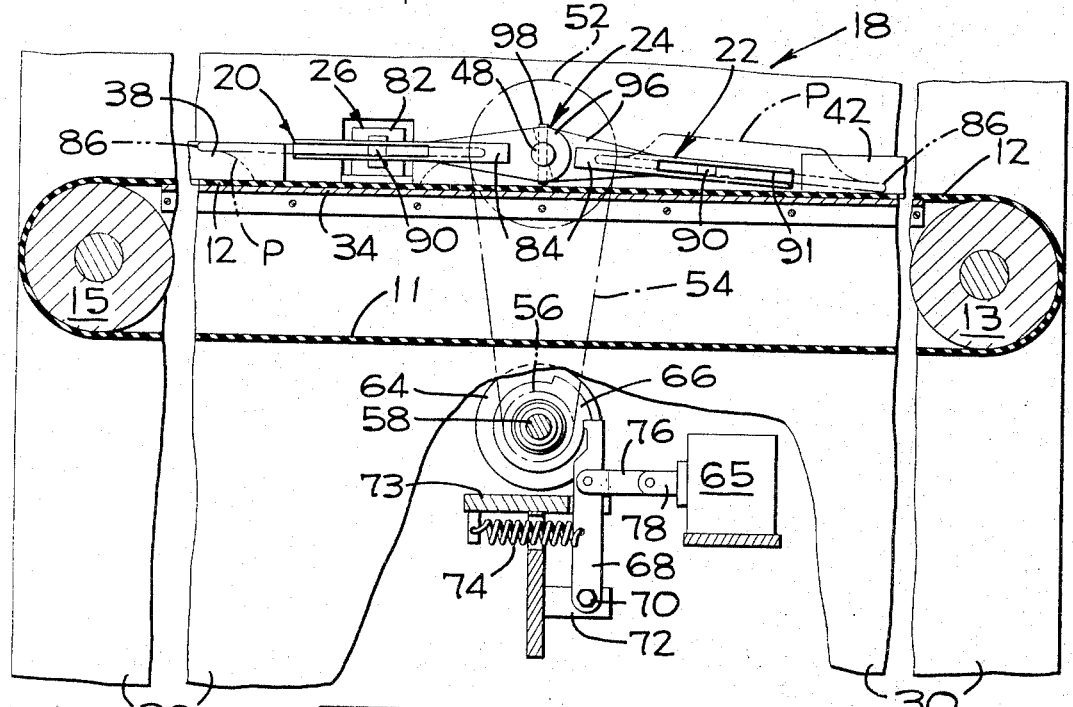
FIG_3
INVENTOR
HEINZ F. CARLSON
BY  *Francis W. Anderson*
ATTORNEY

United States Patent Office 3,347,349
Patented Oct. 17, 1967

3,347,349
PLATE INVERTING APPARATUS
Heinz F. Carlson, Santa Clara, Calif., assignor to FMC Corporation, San Jose, Calif., a corporation of Delaware
Filed Apr. 28, 1966, Ser. No. 546,032
2 Claims. (Cl. 198—33)

ABSTRACT OF THE DISCLOSURE

The upright plates of randomly oriented inverted and upright plates on a conveyor flight are inverted by a turret having diametrically opposed channel-shaped carriers at each side of the conveyor flight. The carriers in plate-receiving position are parallel to the conveying flight and in a plane to receive and slidably support the rim of an upright plate. This plate actuates a carrier-mounted switch effecting substantially 180 degree powered movement of the turret to invert the supported plate and place the other carrier in plate receiving position. A lost motion drive connection between the power source and the plate carriers allows an inverted carrier to descend slightly beyond horizontal and place the downstream rim segment of the plate on the conveying flight to slide the inverted plate out of the carrier.

---

The present invention pertains to scullery equipment, and more particularly relates to apparatus for inverting upright plates on a moving conveyor.

One type of commercial dishwashing machine requires that the soiled plates to be washed are delivered in single file and in inverted positions. The plate inverting apparatus of the present invention receives a single file of spaced, soiled plates in random upright and inverted positions from a sorting machine, and includes a conveyor which delivers the plates to the dishwashing machine after having inverted all of the initially upright plates. The initially inverted plates remain undisturbed on the conveyor. In general terms, the invention provides apparatus so constructed and arranged as to minimize both the time required for an inverting operation and the time of the usual idle or inactive period during which certain parts are returned to their start positions.

One of the objects of the present invention is to provide plate inverting apparatus wherein the idle time between plate inverting operations is minimized.

Another object of the invention is to provide a plate inverting apparatus which is capable of receiving an upright plate for inverting while discharging a previously inverted plate.

Another object is to provide apparatus for inverting spaced apart, moving plates, and which does not require any associated timing mechanism for holding the apparatus at dwell during its operational cycle.

Another object is to provide apparatus for inverting only the upright ones of a single file of randomly oriented moving plates, and through which already inverted plates can pass freely without interruption.

A further object is to provide plate inverting apparatus which, with minor dimensional changes, can handle any circular plate or dish having a laterally projecting rim.

Other objects and advantages of the invention will become evident from the following description and from the accompanying drawings, wherein:

FIGURE 1 is a diagrammatic, fragmentary plan of the plate inverting apparatus of the present invention.

FIGURE 2 is a diagrammatic transverse section taken along lines 2—2 on FIGURE 1.

FIGURE 3 is a diagrammatic transverse section indicated by the lines 3—3 on FIGURE 2.

FIGURE 4 is an enlarged fragmentary detail indicated by the lines 4—4 on FIGURE 2.

FIGURE 5 is a schematic electrical diagram.

Briefly, the plate inverting apparatus 10 (FIG. 1) includes a continuously driven endless belt conveyor 11 having an upper flight 12 which transports a single file of randomly spaced, randomly oriented plates P in the direction of the arrow 16. At an inverting station 18, each lateral edge portion of an upright plate becomes seated in, and supportingly engaged by, an associated plate carrier arm 20 at the side of the conveyor flight 12. Each carrier arm is mounted for rotation in a vertical plane about a horizontal axis 21 which overlies the upper conveyor flight 12 and is normal to the conveying path thereof. Mounted diametrically opposite to each carrier arm 20 is a plate carrier arm 22. The pairs of carrier arms 20 and 22 at each side of the conveyor flight 12 thus comprise a two-part or composite turret 24 that straddles the conveyor flight. The plate carrier arms 20 and 22 are respectively shown in plate loading position, and in plate unloading position. An upright plate P seated in the plate carrier arms 20 actuates a plate sensor 26 which then effects engagement of a power unit 27 to rotate the turret 24.

The power unit rotates the turret 24 for 180 degrees in a direction in which the carrier arms 20 lift the plate P from the conveyor flight 12 and deposit the plate downstream upon the flight in an inverted position at the location formerly occupied by the plate carrier 22. With the turret thus positioned, the inverted plate contacts, and is slid out of the plate carrier arms 20 by the conveyor flight 12, and the plate carrier arms 22 are in the position vacated by the plate carrier arms 20 and are ready to receive the next incoming upright plate, which then causes the same described cycle to repeat. Meanwhile, any incoming plates which are already inverted remain on the conveyor flight 12 and pass freely through the inverting station 18 beneath the plate carrier arms 20 and 22.

More specifically, the endless belt conveyor 11 (FIG. 3) is trained around a drive pulley 13 and a driven pulley 15 and is continuously driven, by means not shown, to move the upper flight 12 in the aforesaid direction. The upper conveyor flight 12 extends between a sorting machine, at its inlet end, and a dishwashing machine, at its outlet end, neither machine being shown. The sorting machine deposits the plates P in single file, randomly spaced upright or inverted orientation upon the inlet end of the upper conveyor flight 12, and the dishwashing machine which eventually receives the plates requires that all plates be in inverted position.

The frame of the plate inverting apparatus 10 includes spaced side walls 30 and 32 (FIGS. 1 and 2) that are interconnected near their upper ends by a horizontal bed plate 34 which supports the upper conveyor flight 12. The incoming plates are guided along a linear path that is defined by the upstanding flanges of associated side rails 38 and 40 that are mounted on the bed plate 34. Downstream of the turret 24, similar guide rails 42 and 44 are provided to continue guidance of the plates after they pass through the inverting station 18. Intermediate the confronting ends of the guide rails 38, 40 and 42, 44, the bed plate 34 has a reduced width only as wide as the upper conveyor flight 12 to allow clearance spaces for the plate carrier arms 20 and 22 of the composite turret 24 to rotate. The turret axis 21 (FIGS. 1 and 2) is defined by coaxial stub stafts 48 and 50 that straddle the conveyor flight 12 and are rotatable journalled in the associated side plates 30 and 32.

Each stub shaft 48 and 50 (FIG. 2) is provided with drive means comprising a driven sprocket 52, and a chain 54 that is trained around the sprocket 52 and around an associated drive sprocket 56. Both drive sprockets 56 have half the number of teeth of the driven sprockets 52, and are secured to a subjacent jackshaft 58 that is rotatably mounted in the frame side plates 30 and 32. The jackshaft 58 is intermittently rotated by a continuously energized, gearhead-type motor 60 which is connected by a coupling 62 to a single revolution clutch 64. The clutch 64 is mounted on one end of the jackshaft 58 and is intermittently actuated by an associated solenoid 65 that is controlled by the plate sensor 26, in a manner later described, such actuation occurring when an incoming upright plate is fully seated in the two plate carrier arms 20.

The driven end of the clutch 60 (FIGS. 2 and 3) includes a ratchet sector 66 that is coupled to the jackshaft 58, and is controlled by a pivoted pawl 68 (FIG. 3) that is linked to the solenoid 65. The pawl is pivoted by a bolt 70 to a block 72 which is part of a bracket 73. The bracket 73 is fixed to the side plate 30 and also supports the motor 60. A tension spring 74 urges the pawl 68 into end-abutting engagement with the ratchet sector 66, in which position the ratchet sector 66 and the jackshaft 58 are immobilized. Intermediate its ends, the pawl 68 is connected by a link 76 to the armature 78 of the solenoid 65.

The coil 80 (FIG. 5) of the solenoid 65 is in series electrical connection with power lines L1 and L2 through a normally open, single pole switch 82 that is a part of the plate sensor 26 (FIG. 1). Momentary closure of the switch 82 briefly energizes the solenoid coil 80 to retract the pawl 68 (FIG. 3) from the ratchet sector 66, whereby the driving power from the motor is coupled to the jackshaft 58 and the stub shafts 48 and 50 are simultaneously rotated in a direction lifting the plate carrier arms 20 from the conveyor flight 12. After the trailing end of the rotating ratchet sector 66 clears the working end of the pawl 68, the spring 74 pulls the pawl 68 inwardly beyond the circumferential path of rotation of the ratchet sector so that at the completion of 360 degrees of rotation of the jackshaft 58, the ratchet sector 66 abuts the pawl 68 and the jackshaft stops.

While the jackshaft 58 rotates one full turn, the stub shafts 48 and 50 rotate a half turn since their associated sprockets 52 have twice the number of teeth of the drive sprockets 56. The turret 24 thus rotates 180 degrees under power each time its drive train is energized as above described.

The plate carrier arms 20 and 22 (FIG. 1) are formed of inwardly facing channels 84 which, when either pair of carrier arms is in loading position, are spaced above the conveyor flight 12 in positions to slidably receive the rim portion 86 of an incoming upright plate P. Each channel 84 at that side of the conveyor flight which is adjacent the switch 82 carries a spring-biased plunger device 85 which includes a horizontal plunger rod having an inner end portion 90 that lies within the open side of the channel in position to be cammed aside by the plate rim 86 when a plate is loaded into the upstream positioned carrier arms.

The plunger rod has a positive inward stop position so that the inner end portion 90 of the plunger rod acts as a stop for the plate when the plate is seated in the plate carrier. A similar plate stop is provided for the laterally opposed channel 84 by the vertical wall of an arcuate recess 91. With a pair of the plate carrier channels 84 in the loading position, an outer end portion 92 of the plunger rod is positioned to press a roller actuator 94 of the switch 82 when the plunger rod is moved outward by the plate. Since the switch 82 (FIG. 5) is thus closed, this latter operation energizes the solenoid coil 80, and the turret 24 rotates in a direction causing the plate carrier arms 20 to rise from the conveyor flight 12 and finally assume the illustrated position of the plate carrier arms 22, and vice versa.

The ensuing description is particularly directed to further details of the plate carrier arms 20, but is equally applicable to the plate carrier arms 22. The same reference numerals are thus applied to the similar parts of both plate carrier arms.

Each channel 84 is secured on one end portion of a drive arm 96. In the case of the plate carrier arms 22, the channels 84 are secured to spacers 97, which are in turn secured to the drive arms, in order to compensate for the offset relation of the drive arms of the two plate carrier arms. The other end of each drive arm is mounted on the associated stub shaft 48 or 50 with a drive connection which permits limited rotation of the stub shaft independent of the drive arm.

The drive connection in each instance comprises a drive pin 98 (FIG. 4) that extends through the stub shaft 48 or 50 and is coextensively movable with the shaft. The outer end portions of the pin 98 lie in circumferentially elongate slots 100 that are provided in the drive arm 96, the relation of the pins and slots being such that the plate carrier arms 20 are immediately driven upward from their plate loading position upon initial rotation of the stub shafts 48 and 50.

Subsequently, the plate carrier arms 20 are driven beyond a vertical plane including the turret axis 21, and gravity then causes the plate carrier arms 20 to advance, relative to the stub shafts 48 and 50, about ten degrees toward their unloading position. The plate carrier arms thus decline about ten degrees from the horizontal and have moved approximately 190 degrees from their initial position after 180 degrees of powered movement of the turret 24. Accordingly, at the end of their movement, the plate carrier arms 20 (FIG. 3) are in the unloading position shown for the plate carrier arms 22, and the rim 86 of the thus inverter plate P lies upon the moving upper conveyor flight 12. The frictional engagement of the plate rim with the conveyor flight is sufficient to slide the plate out of the channels 84, and then the inverted plate is conveyed to the previously mentioned dishwashing machine.

When the plate carrier arms 20 (FIG. 1) move to discharge position, the plate carrier arms 22 swing upstream under the plane of the conveyor flight 12 to the horizontal loading position formerly occupied by the plate carrier arms 20, and thus positioned to receive the next upright one of the incoming plates. However, a plate which approaches the turret 24 in the desired inverted position will have its rim portion 86 (FIG. 2) beneath the horizontal plane of the channels 84 and will thus pass under both plate carrier arms 20 and 22. The rim of the inverted plate will at some downstream point contact the undersides of the plate carrier arms 22, but the arms are free to move upward due to the ten degree lost-motion connection afforded by the drive pins 98 and slots 100, and thus do not unduly obstruct the inverted plate.

A limited minimum interspacing of the plates is necessary to permit sufficient time for the discharge of a plate inverted by the turret 24, and time for turret movement placing the previously emptied plate carrier arms into loading position. Such interspacing, however, is small because the turret mounting of the plate carrier arms 20 and 22 permits simultaneous loading and unloading of the carrier arms. In the present instance, the operational cycle is rapid enough to easily handle the output rate of the sorting mechanism which feeds the plates, and the input rate of the dishwashing machine.

However, the time period for the operating cycle can readily be reduced by providing four pairs of plate carrier arms on the turret 24 so that the carrier arms are spaced only ninety degrees apart on the turret. In the latter instance, the power train ratio from the jackshaft 58 to the turret 24 must be changed so that the sprockets 52 have only one-fourth as many teeth as the sprockets 56, and obvious dimensional changes must also be made so that each stub shaft 48 and 50 can carry the four pairs of plate carrier arms. So constructed, the turret approximately doubles the capacity of the inverting apparatus without interrupting the free passage of plates which are initially received by the conveyor flight 12 in the desired inverted position.

Referring again to the plate interspacing required for the apparatus 10, it will be apparent that no maximum interspace limitations are necessary because the apparatus is self-actuated upon delivery of an upright plate. This mode of actuation is thus important because it eliminates the need of any timing mechanism to hold the turret at dwell to unload the inverted plates, provided, of course, that the speeds of the conveyor 11 and of the turret 24 are properly correlated.

Having thus described the invention, that which is believed to be new, and for which protection by Letters Patent is desired, is:

1. Plate inverting apparatus comprising a frame, a conveyor flight movable along said frame for transporting a single file of randomly oriented upright and inverted plates, means defining a substantially horizontal pivot axis above said conveyor flight and normal to the path of conveying movement, first and second plate carriers straddling said conveyor flight and conjointly movable about said axis, said first and second carriers being diametrically opposed relative to said axis, a lost motion drive connection to each of said first and second plate carriers, power means connected to said drive connection for driving said carriers substantially 180 degrees between a plate receiving position in which one of said carriers slidably, supportably receives opposed rim portions of an upright plate, to a plate releasing position in which the same carrier is inverted and the other carrier is in said plate recieving position, and individual plate sensng means mounted in said first and second plate carriers, said sensing means each being operable when the associated plate carrier is in said plate receiving position to actuate said power means to drive said plate carrier toward said plate releasing position, the driving motion of said power means being terminated substantially at 180 degrees from its initial position so that an inverted carrier, due to said lost motion drive connection, is gravity-urged to decline from said axis to interengage a rim portion of the inverted plate with said conveyor flight.

2. Plate inverting apparatus comprising a frame, a conveyor flight movable along said frame for transporting a single file of randomly oriented upright and inverted plates, means defining a substantially horizontal pivot axis above said conveyor flight and normal to the path of conveying movement, first and second plate carriers straddling said conveyor flight and conjointly movable about said axis, each of said carriers including a pair of inwardly facing channels for slidably receiving the rims of the plates, said first and second carriers being diametrically opposed relative to said axis, power means connected to said carriers for driving said carriers between a plate receiving position in which one of said carriers slidably, supportably receives the opposed rim portions of an upright plate, to a plate releasing position in which the same carrier is inverted, and an electrical switch mounted on said frame for controlling said power means, one channel of each pair of said plate carrier channels being provided with a plunger arranged to be cammed outward by the rim of a plate positioned in the carrier, said plunger when so actuated being aligned with and arranged to move the actuator of said switch, said power means thereby being energized to drive said plate carrier toward said plate releasing position.

References Cited
UNITED STATES PATENTS

| | | | |
|---|---|---|---|
| 1,594,326 | 7/1926 | Richter | 198—33 X |
| 1,970,749 | 8/1934 | Heichert | 198—33 |
| 3,275,122 | 9/1966 | Carlson | 198—33 |

EVON C. BLUNK, *Primary Examiner.*

EDWARD A. SROKA, *Examiner.*